(12) United States Patent
Efron et al.

(10) Patent No.: US 8,326,724 B1
(45) Date of Patent: *Dec. 4, 2012

(54) METHOD AND SYSTEM RELATING TO OPTIONS ON A DEBT TRANSACTION

(75) Inventors: Paul Efron, Larchmont, NY (US); Ivan Ross, Scarsdale, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/883,488

(22) Filed: Sep. 16, 2010

Related U.S. Application Data

(63) Continuation of application No. 11/113,456, filed on Apr. 25, 2005, now Pat. No. 7,818,237.

(60) Provisional application No. 60/565,209, filed on Apr. 23, 2004.

(51) Int. Cl.
*G06Q 40/00* (2006.01)
(52) U.S. Cl. .................................. 705/36 R; 705/35
(58) Field of Classification Search ........................ None
See application file for complete search history.

(56) References Cited

U.S. PATENT DOCUMENTS

| | | | |
|---|---|---|---|
| 4,648,038 | A | 3/1987 | Roberts et al. |
| 5,557,517 | A | 9/1996 | Daughterty, III |
| 6,233,566 | B1 | 5/2001 | Levine et al. |
| 2002/0042770 | A1 | 4/2002 | Slyke et al. |
| 2002/0147670 | A1 | 10/2002 | Lange |
| 2003/0093375 | A1 | 5/2003 | Green et al. |
| 2004/0133491 | A1 * | 7/2004 | Cochran .......................... 705/35 |
| 2004/0133494 | A1 * | 7/2004 | Jones et al. ..................... 705/35 |

OTHER PUBLICATIONS

Bodie, Zvi; Kane, Alex; Marcus, Alan. Investments. McGraw-Hill. 1996. pp. 52-53; 386-387; 389-392; 397-399; 601-606; 620-621; 623; 630-631; 634-635.

* cited by examiner

*Primary Examiner* — Jason M Borlinghaus
(74) *Attorney, Agent, or Firm* — Perkins Coie LLP

(57) ABSTRACT

Various embodiments of the present invention are directed to methods and systems relating to options on a debt transaction (e.g., put and call options may be utilized to create an economic effect similar to a reduction in debt of an issuer in exchange for enhancing the terms of a debt holder's existing debt investment). More particularly, one embodiment relates to a method implemented by a programmed computer system for use in a financial transaction involving a debt issuer and a debt holder, comprising: entering into a put/call contract between the debt issuer and the debt holder, wherein the debt issuer sells the put and buys the call and the debt holder buys the put and sells the call; inputting data associated with the put/call contract regarding conditions under which the debt issuer may retire outstanding debt of the debt issuer; inputting data associated with the put/call contract regarding conditions under which the debt holder may retire outstanding debt of the debt issuer; and retiring at least some of the outstanding debt, wherein the outstanding debt is retired utilizing calculations based upon the input data regarding conditions associated with the put/call contract under which the debt issuer and the debt holder may retire outstanding debt.

17 Claims, 4 Drawing Sheets

METHOD AND SYSTEM RELATING TO OPTIONS ON A DEBT TRANSACTION

RELATED APPLICATIONS

This application is a continuation of and claims priority to U.S. patent application Ser. No. 11/113,456 filed on Apr. 25, 2005 and entitled "Method And System Relating To Options On A Debt Transaction," which claims the benefit of U.S. Provisional Application Ser. No. 60/565,209, filed Apr. 23, 2004. The entire content of each application is hereby incorporated by reference.

FIELD OF THE INVENTION

Various embodiments of the present invention are directed to methods and systems relating to options on a debt transaction (e.g., put and call options may be utilized to create an economic effect similar to a reduction in debt of an issuer in exchange for enhancing the terms of a debt holder's existing debt investment).

More particularly, one embodiment relates to a method implemented by a programmed computer system for use in a financial transaction involving a debt issuer and a debt holder, comprising: entering into a put/call contract between the debt issuer and the debt holder, wherein the debt issuer sells the put and buys the call and the debt holder buys the put and sells the call; inputting data associated with the put/call contract regarding conditions under which the debt issuer may retire outstanding debt of the debt issuer; inputting data associated with the put/call contract regarding conditions under which the debt holder may retire outstanding debt of the debt issuer; and retiring at least some of the outstanding debt, wherein the outstanding debt is retired utilizing calculations based upon the input data regarding conditions associated with the put/call contract under which the debt issuer and the debt holder may retire outstanding debt.

BACKGROUND OF THE INVENTION

From the perspective of an issuer, deterioration in the issuer's credit profile may shift the issuer's sources of debt funding (e.g., from investment grade to non-investment grade markets). Moreover, outstanding debt may be traded at reduced market values due to a mismatch in terms relative to the current credit profile (e.g., coupon, covenants, maturity).

In this regard, there may be opportunity for significant improvement in the credit profile if the issuer can capture some of the economic benefit of the reduced market value of its debt (one embodiment of the present invention provides a synthetic mechanism for capturing the economic benefit—such a synthetic mechanism may have significant advantages due, for example, to reduced friction and tax costs).

From the perspective of a holder of the issuer's debt, a dislocation in investor base (e.g., from investment grade to non-investment grade) may contribute to reduced trading value and liquidity. Moreover, mismatches in maturity, covenants and coupons relative to the issuer's credit profile may represent impediments to determining fair value for outstanding debt.

In this regard, there may be opportunity for improvement in near-term trading value by "splitting-the-difference" relative to par with issuer and obtaining appropriate maturity, covenants and coupons debt (one embodiment of the present invention provides a mechanism for such "splitting-the-difference").

Figure 1A:
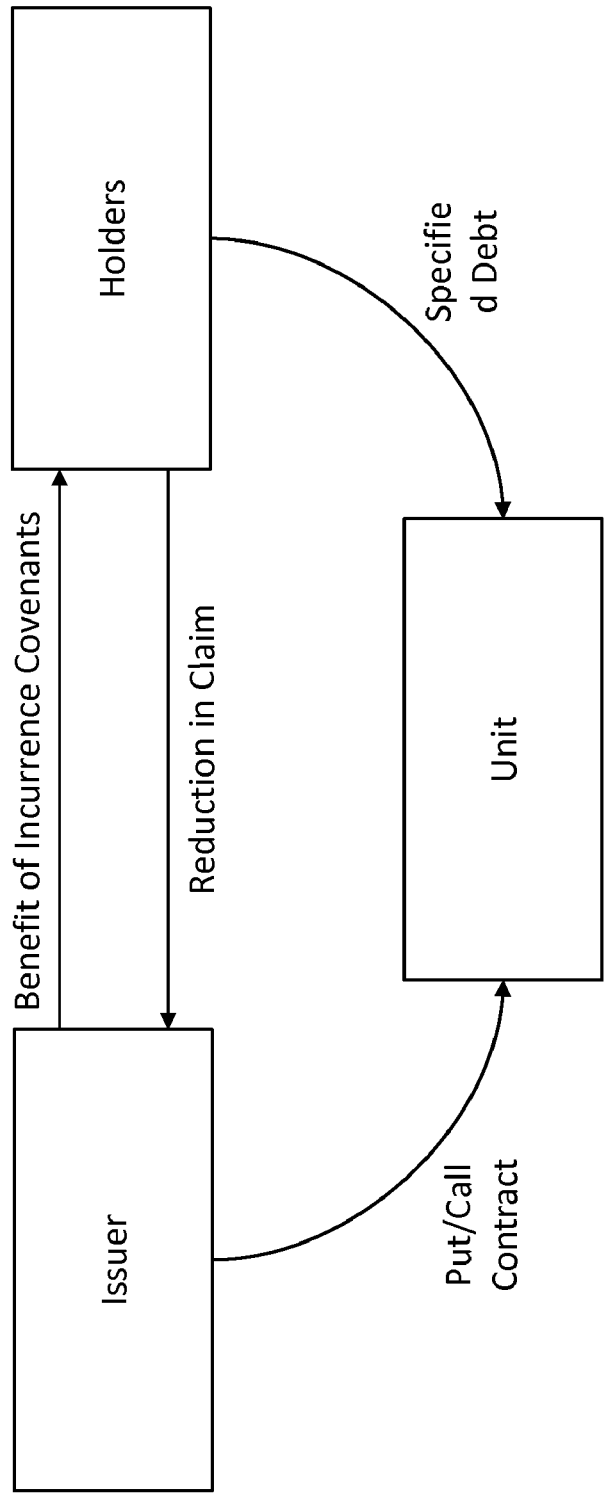
FIGS. 1A-1D show a financing structure/transaction according to an embodiment of the present invention.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Referring now to an overview of one embodiment of the present invention, it is noted that an options on debt transaction according to this embodiment may utilize an essentially simultaneous issuance of put and call options that are bundled into a separable unit with a certain class or series of an issuer's outstanding debt (which outstanding debt may change from time to time). More particularly, under this embodiment:

The put/call contract between the issuer (issuer sells put, buys call) and the holder or holders (holder buys put, sells call) may have shorter maturities than some or all of the issuer's existing debt.

European-style put and call options may give the holder and issuer the right to retire outstanding debt at a specific price in the future that represents a premium relative to current trading levels but is less than par.

The put/call contract may also include fixed maintenance payments (from the issuer to the holder, or vice versa) and/or non-investment grade incurrence covenants (e.g., related to acceleration of the put) that are appropriate for the issuer's current credit profile.

Holders may pledge their outstanding debt as a withdrawable collateral component of the unit (e.g., backing their obligations under the call option).

Holders may also agree as part of put/call contract to reduce the repayment claim associated with their pledged debt in the event of an acceleration or bankruptcy.

It is believed that the issuer should have no current recognition of cancellation of indebtedness income for tax purposes since existing debt remains unmodified, outstanding and separable from the put/call contract Still referring to the present options on debt transaction embodiment, it is noted that transaction objectives may include, but not be limited to, the following:

Economically and contractually reduce issuer's aggregate debt burden.

No current COD tax payable since no specific debt class has been modified.

Enable holders to substitute alternative collateral, e.g., other classes of issuer debt and/or Treasury bills (arbitrage-based trading may be inhibited by more restricted liquidity of "substitute" or "stripped" units).

Referring now to specific illustrative examples of various components and terms associated with the present options on debt transaction embodiment (which examples are intended to be illustrative and not restrictive), it is noted that:

The put/call contract may allow participating holders to put $1000 face amount of certain classes or series of issuer debt (or "Specified Debt") to issuer in year 12 for $800, as compared to a current trading value of $750. Terms of put/call contract may also allow issuer to call $1000 face amount of Specified Debt from participating Holders in year 15 for $800.

Participating holders must pledge $1000 face amount of Specified Debt or $200 Treasury bills as collateral to secure their obligations under the call portion of the embedded contract.

Holders make fixed annual maintenance payments of $3.50 (or 35 bp of face amount of Specified Debt) prior to expiration of the put option—paid by redirecting the appropriate portion of interest income on pledged Specified Debt.

Pledged Specified Debt or Treasury bills may be contributed to an escrow account and held by a collateral agent.

Holders may elect, from time to time, to substitute alternative classes of issuer's debt that meets certain prescribed specifications necessary to be considered "Eligible Debt", such as maturity (e.g., at least as long as Specified Debt) and seniority (e.g., pari passu with Specified Debt).

Holders may also elect to substitute Treasury bills to support their potential obligation under the call option.

Holders continue to receive coupon income from Eligible Debt or Treasures that are held by collateral agent, reduced by any maintenance payments owed to issuer depending on actual class of debt substituted.

Bankruptcy acceleration of put/call contract effectively results in holder forfeiting $200 of principal claim relating to any debt held by collateral agent on behalf of holder (or forfeiture $200 of Treasuries contributed by holder to collateral agent as a net settlement).

Of note, various substitution alternatives associated with the above-described example may include (but not be limited to) following:

Reclaim $1000 face amount of initially pledged Specified Debt and replace with $1000 face amount of other Eligible Debt, creating a "substitute unit"

Reclaim $1000 face amount of initially pledged Specified Debt and pledge short-term Treasuries with $200 principal amount (maximum net-value investors would have to deliver to issuer upon call exercise), creating a "stripped unit.

Figure 1B:
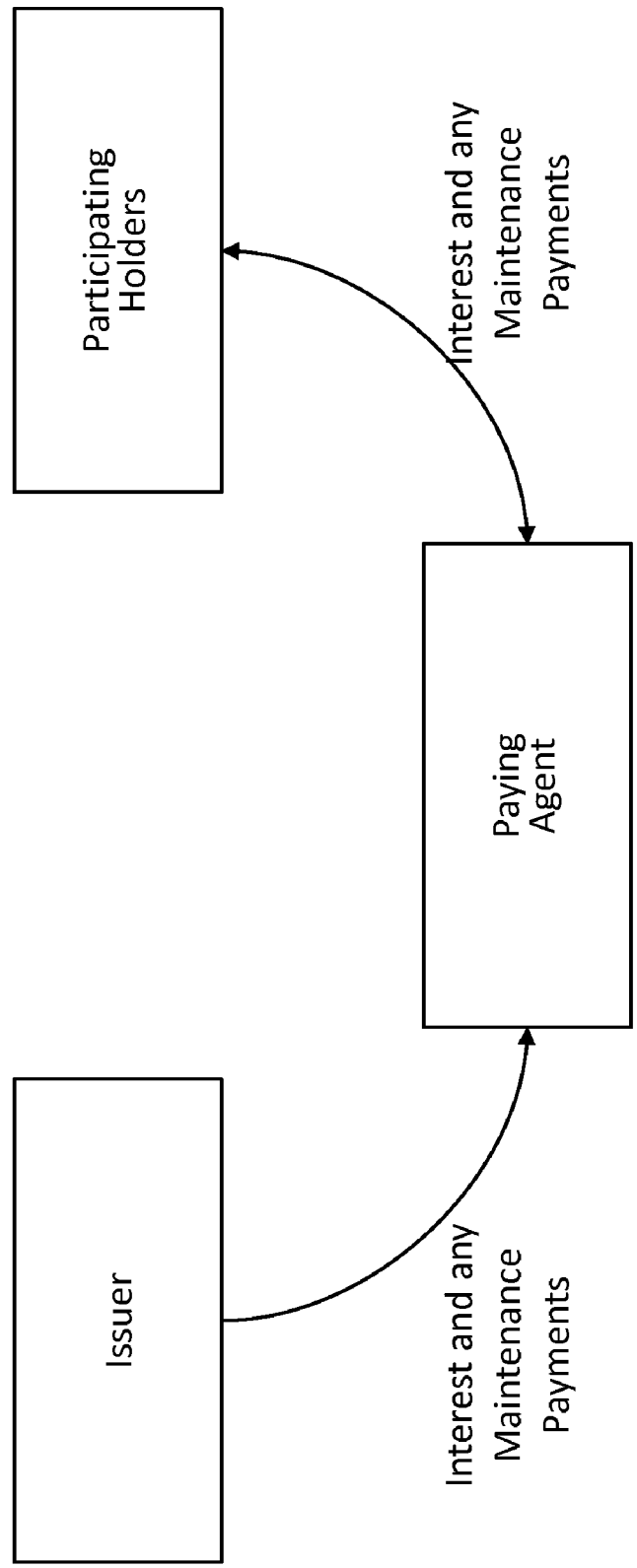
Figure 1C:
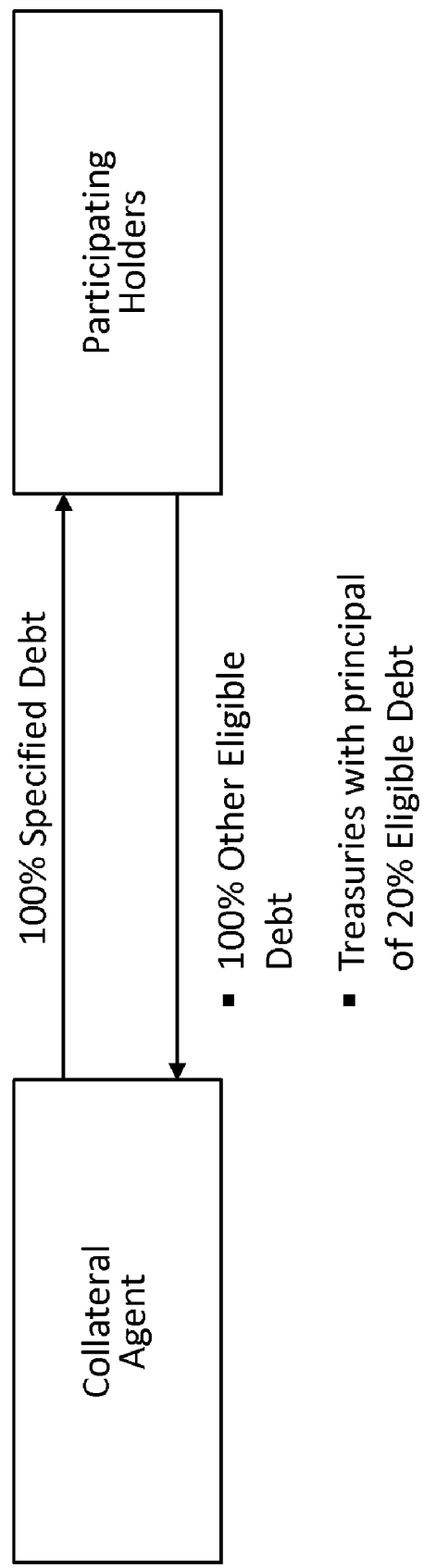

Referring now to FIGS. 1A-1CD, funds flow and settlement alternatives of an embodiment of the invention will be described (FIG. 1A refers to components of a unit; FIG. 1B refers to interim funds flow; FIG. 1C refers to substitution rights and FIG. 1D refers to settlement of a unit).

More particularly, as seen in FIG. 1A, issuer enters into put/call contract with holders who transfer Specified Debt or Treasury bills to collateral agent to support obligations under the embedded call in the contract. Further, the put/call contract may include covenants appropriate for non-investment grade issuers. Further still, the holders contractually reduce claim in the event of acceleration.

Moreover, as seen in FIG. 1B, prior to exercise of put or call, holders receive interest payments on any pledged Specified Debt as well as fixed maintenance payments on the unit, if appropriate. Further, the terms of Specified Debt relative to offered yield on unit determine whether a portion of coupon is paid back to issuer.

Moreover, as seen in FIG. 1C, holders have the right to substitute collateral in respect of the call obligation (e.g., different classes of issuer's Eligible Debt or Treasuries with a principal amount equal to 20% of par amount Eligible Debt requirement).

Figure 1D:
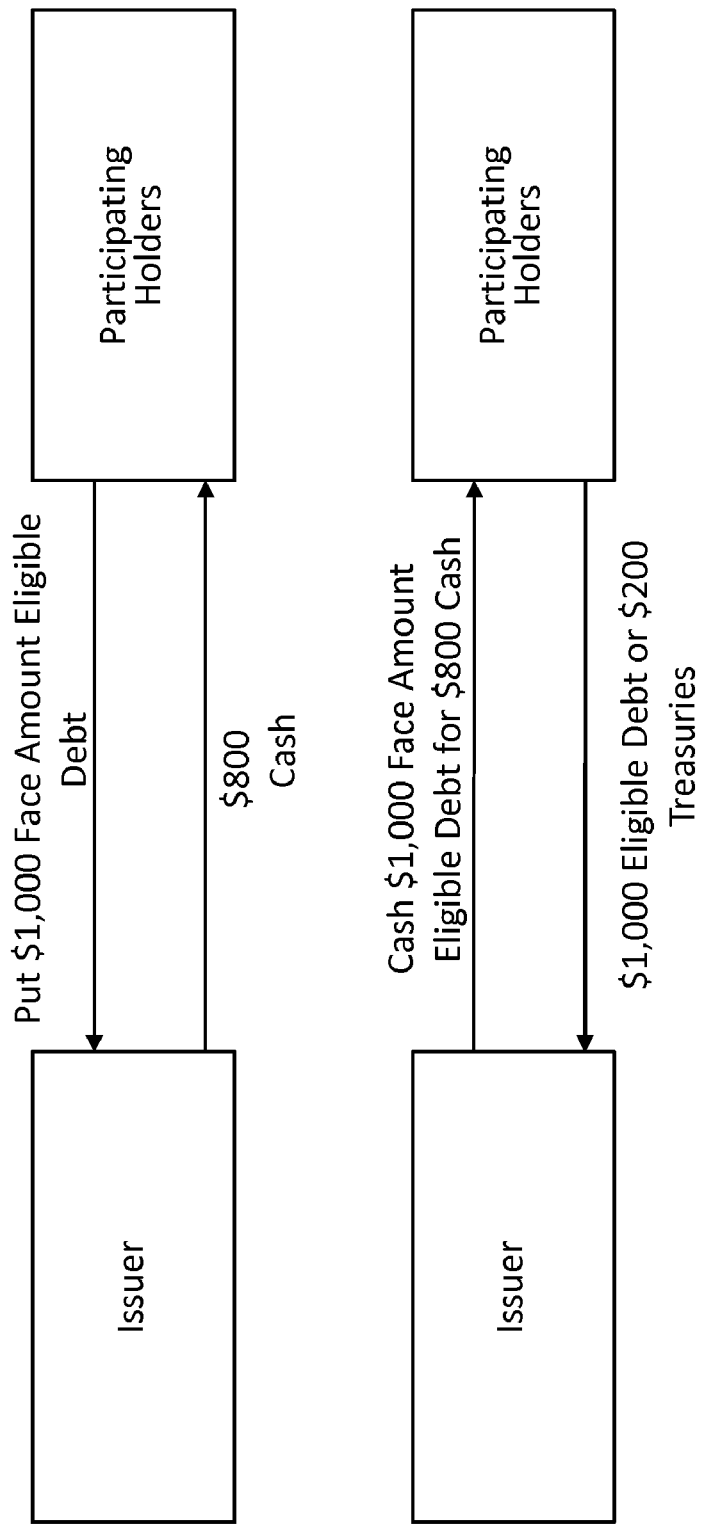

Moreover, as seen in FIG. 1D, on put exercise, investors tender 100% of Eligible Debt $1000 face amount in exchange for $800 (it is believed that this would trigger taxable cancellation of debt income to issuer). Further, on call exercise, issuer pays $800 per $1000 face amount Eligible Debt or receives net settlement of $200 in Treasuries.

Reference will now be made to an illustrative example credit impact analysis (benefits and issues to consider) related to an embodiment of the present invention (of course, this example is intended to be illustrative and not restrictive).

More particularly, it is noted with regard to benefits that:
There may be meaningful economic debt reduction for issuer.
Upon exercise of either put or call.
Contractual reduction of holders' claims in the event of bankruptcy or acceleration.
May also result in improvement in issuer's interest coverage if holders have to make contract maintenance payments out of coupon income.
Enhanced investment opportunity for holders.
Improved liquidity via unit structure.
Re-aligned covenants and maturity profile that are appropriate for issuer's current credit profile.
Maintenance payments on put/call contract help ensure holder obtains fair value for contract.
Should not result in any current tax cost to issuer Further, it is noted with regard to issues to consider that:
There may be economic reduction in issuer's maturity profile if put or call are exercised.
However, term may still be long-term (e.g., 12-15 years) and may be structured to match issuer's specific maturity profile.
Earliest possible redemption via put/call contract may be structured to occur later than recently-issued 7 and 10 year non-investment grade debt.
Potential increase in issuer's cash expenses requirements if maintenance payments on put/call contract require net payments to holders.
It is believed that GAAP statements will not reflect the debt reduction, despite economic and contractual impact.

Reference will now be made to an illustrative example of terms and settlement related to an embodiment of the present invention (of course, this example is intended to be illustrative and not restrictive).

More particularly, it is noted with regard to strike price and expiration that:
European-style put and call contract between issuer and holder grants the following rights:
Holder has right to require that issuer purchases $1,000 face amount of Eligible Debt for $800 on last day of Year 12.
Issuer has right to require that holder deliver $1,000 face amount of Eligible Debt for $800 on last day of Year 15.

Further, it is noted with regard to collateral requirement that:
Upon entering into put/call contract (and at any time that holder remains a party to the contract), holder must post collateral via one of the following methods:
Deposit $1,000 face amount of issuer's Specified Debt.
Deposit $1,000 face amount of issuer's securities that qualify as Eligible Debt.
Deposit $200 of short-term Treasuries.
Issuer may have no ability to specify or restrict holders' ability to withdraw and substitute replacement collateral, so long as it qualifies under one of the methods described above.

Further, it is noted with regard to additional contract terms that:
Issuer agrees to covenants typical of non-investment grade debt indentures.
Issuer and holder agree to make or receive fixed periodic payments that represent the "value spread" between the put and call components of the contract.
Holder agrees to forfeit $200 of bankruptcy claim relating to each $1,000 of Specified or Eligible Debt pledged as collateral (or forfeits entire $200 of Treasuries if substituted as collateral).

Further, it is noted with regard to net settlement that:
At the option of the holder, the call obligation may be settled in cash for $200, enabling holder to retain ownership of the Eligible Debt (and reclaim any collateral on deposit with collateral agent).
Put obligation may not be net settled.

Reference will now be made to an illustrative example of rational for substitution of underlying collateral related to an embodiment of the present invention (of course, this example is intended to be illustrative and not restrictive). More particularly, it is noted that:
Unit holders will likely choose to substitute collateral among the various classes of Eligible Debt for a variety of reasons. In particular, since the exchange ratios relating to each class of Eligible Debt may be set at the pricing date, it is likely that subsequent changes in the non-unit trading prices of the various classes will result in one class becoming "cheaper to deliver" relative to other classes.
Variations in duration and convexity across classes of Eligible Debt—Upon large moves in yields for a given issuer, the relative non-unit trading prices of the Eligible Debt classes will change dramatically. The larger the original difference in duration, the larger the potential divergence in relative trading prices. For example (which example is intended to be illustrative and not restrictive), an 8% 25-year bond priced at 75 has a 8.9 duration, and an 8% 30-year bond priced at 75 has a 9.1 duration.
If yields fall by 100 bp on each bond the prices of the 25-year and 30-year bonds will be 82.20 and 82.46, respectively. That is a ratio of 1.003 versus the original 1.000.
If yields rise by 100 bp on each bond the prices of the 25-year and 30-year bonds will be 68.82 and 68.68, respectively. That is a ratio of 0.998 versus the original 1.000.
Maturation of Eligible Debt—Over the life of the Eligible Debt, the relative duration and applicable Treasury pricing benchmarks will change.
Over a 12-year horizon (for example), 25-year and 30-year bonds become 13-year and 18-year bonds with respective durations (assuming constant yields) of 7.3 and 8.3, implying increased sensitivity to shifts in yield for the issuer and enhanced likelihood that Eligible Debt trading prices diverge, as described above.
Similarly, the aging of the bonds will require that different US Treasury securities are utilized as the applicable underlying pricing benchmark. As of about April, 2004, the difference in US Treasury rates between an 8-year and 20-year security was approximately 130 bp, while the yield difference between an 18-year and 30-year security was only 10 bp. Assuming constant credit spreads, the yield on 20-year Eligible Debt would drop by more than 120 bp over the life of the class. Since the different classes of Eligible Debt mature at different rates, non-unit trading prices are likely to diverge even if credit spreads relative to the applicable US Treasury benchmark securities remain constant.
Evolution of the yield curve—The relative shape of the yield curve can change dramatically over a 12-year period. As of about April, 2004, the US Treasury yield curve between 10 years and 30 years was extremely steep, whereas six years ago it was nearly flat. In addition to the measurable shifts in relative duration as the various classes of Eligible. Debt age, changes in the shape of the yield curve could contribute to further divergence (or convergence) of non-unit trading prices of Eligible Debt classes.
In addition to substitution among various classes of Eligible Debt, there are several scenarios in which unit holders would likely substitute Treasury securities as collateral:
Significant rally in trading prices of Eligible Debt—If it became apparent that the issuer's credit spread and Eligible Debt yield levels will trade not only above the exercise price of the put/call options but also above face value, then investors would likely substitute US Treasury notes as collateral to reduce the implied loss in present value when the call option is exercised (i.e. unit holder elects net settlement option).
"Short strategy" in the event of decline in trading prices of Eligible Debt—If the issuer's credit profile is deteriorating, unit holders may reclaim pledged Eligible Debt and substitute US Treasury notes as collateral, speculating that non-unit trading prices for Eligible Debt will continue to decline (allowing for later re-substitution of Eligible Debt purchased at lower than current price).
Reluctance to hold high-default risk investments—In the event of severe declines in an issuer's credit profile, unit holders may seek to substitute US Treasury notes as collateral, enabling the unit holder to liquidate its position in the underlying Eligible Debt and avoid holding defaulted securities that might violate its investment charter or require additional regulatory capital.

Of note, the invention may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implemented". In this regard, it is noted that while such methods can be implemented using a computer, the methods do not necessarily have to be implemented using a computer. Also, to the extent that such methods are implemented using a computer, not every step must necessarily be implemented using a computer. Further, the specific dates, time spans, rates, prices, values and the like described with reference to the various examples are, of course, illustrative and not restrictive. Further still, the invention may encompass a "structure," a "transaction," a "system" and/or a "method". Further still, any actions or steps may be done periodically (wherein the term periodic could refer, for example, to daily, weekly, monthly, quarterly, semiannually, annually or at varying intervals). Further still, the various steps may be carried out in any desired order, one or more steps may be deleted and/or one or more steps may be added.

What is claimed is:

1. A method implemented by a programmed computer system for use in a financial transaction involving a debt issuer and a debt holder, comprising:
   inputting, into the computer system, data associated with entry into a multi-component option contract between the debt issuer and the debt holder, wherein the debt issuer sells a put on outstanding debt between the debt issuer and the debt holder and buys a call on the outstanding debt, and the debt holder buys the put and sells the call as a counterparty to the multi-component option contract;
   inputting, into the computer system, data associated with the multi-component option contract regarding conditions for retiring the outstanding debt of the debt issuer by the debt issuer, and conditions for retiring the outstanding debt of the debt issuer by the debt holder; and
   retiring some of the outstanding debt, wherein the outstanding debt is retired utilizing a calculation, done by the computer system, based upon the input data regarding the conditions associated with the multi-component option contract;
   wherein the multi-component option contract is bundled into a separable unit with some of the outstanding debt, allowing substitution of the outstanding debt with other predetermined eligible collateral.

2. The method of claim 1, wherein some of the outstanding debt is held by the debt holder.

3. The method of claim 1, wherein the debt holder pledges at least some of the outstanding debt which is held by the debt holder and which is bundled into the unit as a collateral component of the unit.

4. The method of claim 1, wherein the collateral component is pledged as a withdrawable collateral component, substitutable with other predetermined eligible collateral.

5. The method of claim 4, wherein the multi-component option contract comprises an agreement by the debt holder that a bankruptcy or acceleration reduces a repayment claim associated with the pledged debt.

6. The method of claim 4, wherein the collateral component is pledged as a withdrawable collateral component, substitutable with other eligible collateral, to back the obligations of the debt holder under the call.

7. The method of claim 6, wherein the debt provides substitute collateral to replace at least part of the outstanding debt which is held by the debt holder and which is bundled into the unit.

8. The method of claim 7, wherein the substitute collateral comprises U.S. Treasuries.

9. The method of claim 1, wherein the multi-component option contract gives the debt issuer the right to retire at least some of the outstanding debt at a predetermined price in the future.

10. The method of claim 1, wherein the multi-component option contract gives the debt holder the right to retire at least some of the outstanding debt at a predetermined price in the future.

11. The method of claim 1, wherein the multi-component option contract includes at least one maintenance or interest payment.

12. The method of claim 11, wherein the multi-component option contract includes a plurality of periodic maintenance or interest payments.

13. The method of claim 12, wherein the plurality of periodic maintenance or interest payments are made from the debt issuer to the debt holder.

14. The method of claim 12, wherein the plurality of periodic maintenance or interest payments are made from the debt holder to the debt issuer.

15. The method of claim 1, wherein the multi-component option contract includes at least one incurrence covenant related to acceleration of the put.

16. The method of claim 1, wherein the call is net settled.

17. A programmed computer system for use in a financial transaction involving a debt issuer and a debt holder, comprising:
   a memory;
   a processor disposed in communication with said memory, said memory storing processor-executable instructions issuable by said processor to:
   input data associated with entry into a multi-component option contract between the debt issuer and the debt holder, wherein the debt issuer sells a put on outstanding debt between the debt issuer and the debt holder and buys a call on the outstanding debt, and the debt holder buys the put and sells the call as a counterparty to the multi-component option contract;
   input, into the computer system, data associated with the multi-component option contract regarding conditions for retiring the outstanding debt of the debt issuer by the debt issuer and conditions for retiring the outstanding debt of the debt issuer by the debt holder; and
   retire some of the outstanding debt, wherein the outstanding debt is retired utilizing a calculation based upon the input data regarding the conditions associated with the multi-component option contract;
   wherein the multi-component option contract is bundled into a separable unit with some of the outstanding debt, allowing substitution of the outstanding debt with other predetermined eligible collateral,
   wherein the multi-component option contract gives the debt holder and the debt issuer the right to retire at least some of the outstanding debt at the predetermined price in the future, and
   wherein the predetermined price is at a premium relative to a current trading level of the outstanding debt and the predetermined price is less than a par value of the outstanding debt.

* * * * *